United States Patent [19]
Phears

[11] Patent Number: 5,558,359
[45] Date of Patent: Sep. 24, 1996

[54] COLLAPSIBLE LUGGAGE CARRIER

[76] Inventor: William D. Phears, 1781 Freedom Dr., Melbourne, Fla. 32940

[21] Appl. No.: 462,187

[22] Filed: Jun. 5, 1995

[51] Int. Cl.⁶ ..................................................... B62B 3/02
[52] U.S. Cl. .................. 280/654; 280/47.371; 280/79.3
[58] Field of Search ..................................... 280/651, 645, 280/654, 655, 47.18, 47.26, 47.35, 47.34, 47.371, 62, 79.3, 79.11

[56] References Cited

U.S. PATENT DOCUMENTS

| | | | |
|---|---|---|---|
| 3,102,733 | 9/1963 | Burnett | 280/654 |
| 3,191,959 | 6/1965 | Heimbruch | 280/79.3 |
| 4,072,319 | 2/1978 | Berger | 280/654 |
| 4,299,403 | 11/1981 | Brewer et al. | 280/47.29 |
| 4,726,602 | 2/1988 | Sanders | 280/79.3 |
| 4,865,346 | 9/1989 | Carlile | 280/654 |
| 4,917,392 | 4/1990 | Ambasz | 280/40 |
| 4,950,003 | 8/1990 | Holtz | 280/655 |
| 5,002,304 | 3/1991 | Carrigan | 280/655 |
| 5,195,726 | 3/1993 | Kaner | 254/325 |
| 5,242,189 | 9/1993 | Osaki | 280/645 |
| 5,263,727 | 11/1993 | Libit et al. | 280/40 |

Primary Examiner—Anne Marie Boehler
Attorney, Agent, or Firm—David L. Baker; Rhodes & Ascolillo

[57] ABSTRACT

A collapsible luggage carrier has a support frame and at least one support arm attached to the support frame. There is a tubular axle sleeve member attached to the support arms and a rear axle in and extending beyond opposing ends of the axle sleeve member. A rear wheel is rotatively attached to each end of the rear axle. A lower handle member is rotatively connected to the rear axle and is adjacent the opposing ends of the axle sleeve member. An upper handle member is slidingly and lockingly connected to the lower handle. A handle locking member is releasably secured to the lower handle member and to the upper handle member. The handle locking member has a first bar and a second bar opposing the first bar. A cross member of the lower handle member is placed within a first channel to releasably grasp the lower handle member and each of the side bars of the upper handle member are placed in the second channels to releasably grasp the upper handle member. A first passageway extends through the first bar and a second passageway extends through the second bar. There is a handle lock. There is a releasable lower handle upright locking brace. A front wheel is rotatingly connected to the support frame at an end of the support frame distal the rear axle. A support grill adjustment bar is attached to an upper side of the support frame and a support grille is slidingly connected to the support grill adjustment bar. A loading and unloading inclined ramp is on the end of the support frame distal the rear axle.

3 Claims, 3 Drawing Sheets

COLLAPSIBLE LUGGAGE CARRIER

BACKGROUND OF THE INVENTION

1. Field of the Invention

This invention relates, in general, to a wheeled luggage carrier and, in particular, to a collapsible wheeled luggage carrier.

2. Description of the Related Art

Many people use portable luggage carriers to help them transport luggage through airports, train stations and bus stations. Trying to carry several pieces of luggage in two hands is an ordeal to which not many people look forward. Several carriers have been developed. Many are too large and look more like industrial dollies. Many are too small and will not accept very many pieces of luggage or other parcels without dumping their load at the first turn. Many are too heavy for some travelers to use with ease especially if they have to lift the carrier over their head to place it in the overhead luggage racks on an airplane.

U.S. Pat. No. 4,299,403 W. R. Brewer et al., on Nov. 10, 1981 for a Wheeled Carrier for Hand Luggage and the Like describes a carrier having truss-like wire construction and having an upper frame and a lower frame. The assembly is locked into position by spring latches.

U.S. Pat. No. 4,917,392 to E. Ambasz on Apr. 17, 1990 for a Collapsible Luggage Carrier shows a carrier having an upper section and a lower section. The lower section has wheels which fold inward and the lower section folds upwards toward the upper section. The upper section has telescoping handles.

U.S. Pat. No. 5,195,726 to A. Kaner on Mar. 23, 1993 for a Portable Luggage Carrier describes a foldable carrier having an extendible lifting winch to lift heavy items from a vehicle trunk.

U.S. Pat. No. 5,242,189 to S. Osaki on Sep. 7, 1993 for a Wheeled Luggage Carrier shows a wheeled a-frame that carries luggage strapped on top of one leg of the frame. The frame scissors together for storage.

U.S. Pat. No. 5,263,727 to J. M. Libit, et al., on Nov. 23, 1993 for a Foldable Luggage Carrier describes a boxlike main member to which wheels are attached. A lower frame folds out from the main member and a handle telescopes up from the main member.

SUMMARY OF THE INVENTION

The present invention solves many of these problems by providing a carrier with a lightweight tubular frame with a extendable handle and a fold out set of wire wings to allow the user to add additional bags and still keep the center of gravity and balance low so that the carrier does not spill all the bags off at the first turn. There is also a convenient and useful loading and unloading ramp to aid a user to slide heavy items on and off the carrier easily onto or off of a curb or step. The luggage may be easily secured to the carrier by a set of stretchable cords (Bungee Cords). The large wheels allow the user to roll over obstacles such as curbs and other uneven surfaces easily. A basket may be easily attached to carry small items. Such a basket would be useful for trips to the supermarket. The front wheel easily swivels on a castor to facilitate turning. The extendible handle locks in place at a user's selected height and the handle is canted at an angle convenient for a person to either push or pull the carrier without having the carrier bump into them all the time.

In one aspect of the present invention, a collapsible luggage carrier is described that has a support frame and at least one support arm attached to the support frame. There is a tubular axle sleeve member attached to the support arms. There is a rear axle in and extending beyond opposing ends of the axle sleeve member. A rear wheel is rotatively attached to each end of the rear axle. A lower handle member is rotatively connected to the rear axle and is located adjacent the opposing ends of the axle sleeve member. An upper handle member is slidingly and lockingly connected to the lower handle.

There is a releasable lower handle upright locking brace adjacent the support frame and a pair of opposing locking brace supports abutting the locking brace. A front wheel is rotatingly connected to the support frame at an end of the support frame distal the rear axle. There is a support grill adjustment bar attached to an upper side of the support frame. A support grille is slidingly connected to the support grill adjustment bar and a support grille wing is hingedly attached to opposing ends of the support grille.

In another aspect of the present invention, a collapsible luggage carrier is described that has a support frame and at least one support arm attached to the support frame. A tubular axle sleeve member is attached to the support arms and there is a rear axle in and extending beyond opposing ends of the axle sleeve member. There is a rear wheel rotatively attached to each end of the rear axle. A lower handle member is rotatively connected to the rear axle and is placed adjacent the opposing ends of the axle sleeve member.

There is an upper handle member slidingly and lockingly connected to the lower handle. A handle locking member is releasably secured to the lower handle member and to the upper handle member. The locking member has a first bar and a second bar opposing the first bar. There is a first channel in the first bar releasably grasping the lower handle member and a pair of second channels in the second bar releasably grasping the upper handle and normal to the first channel. A first passageway extends through the first bar and a second passageway extends through the second bar and directly opposes the first passageway. There is a handle locking rod within and extending through the first passageway and within and extending through the second passageway. There is a locking thread on one end of the handle locking rod and a locking knob threadingly engaged on the thread. Handgrip protrusions on the locking knob help the user to better grip the locking knob.

There is a releasable lower handle upright locking brace adjacent the support frame and a pair of opposing locking brace supports abutting the locking brace. A front wheel is rotatingly connected to the support frame at an end of the support frame distal the rear axle. There is a support grill adjustment bar attached to an upper side of the support frame and a support grille slidingly connected to the support grill adjustment bar. A support grille wing is hingedly attached to opposing ends of the support grille.

It is an object of this invention to provide a luggage, produce, and equipment carrier that is versatile, easy to use and store.

DESCRIPTION OF THE PREFERRED EMBODIMENT

Figure 1:
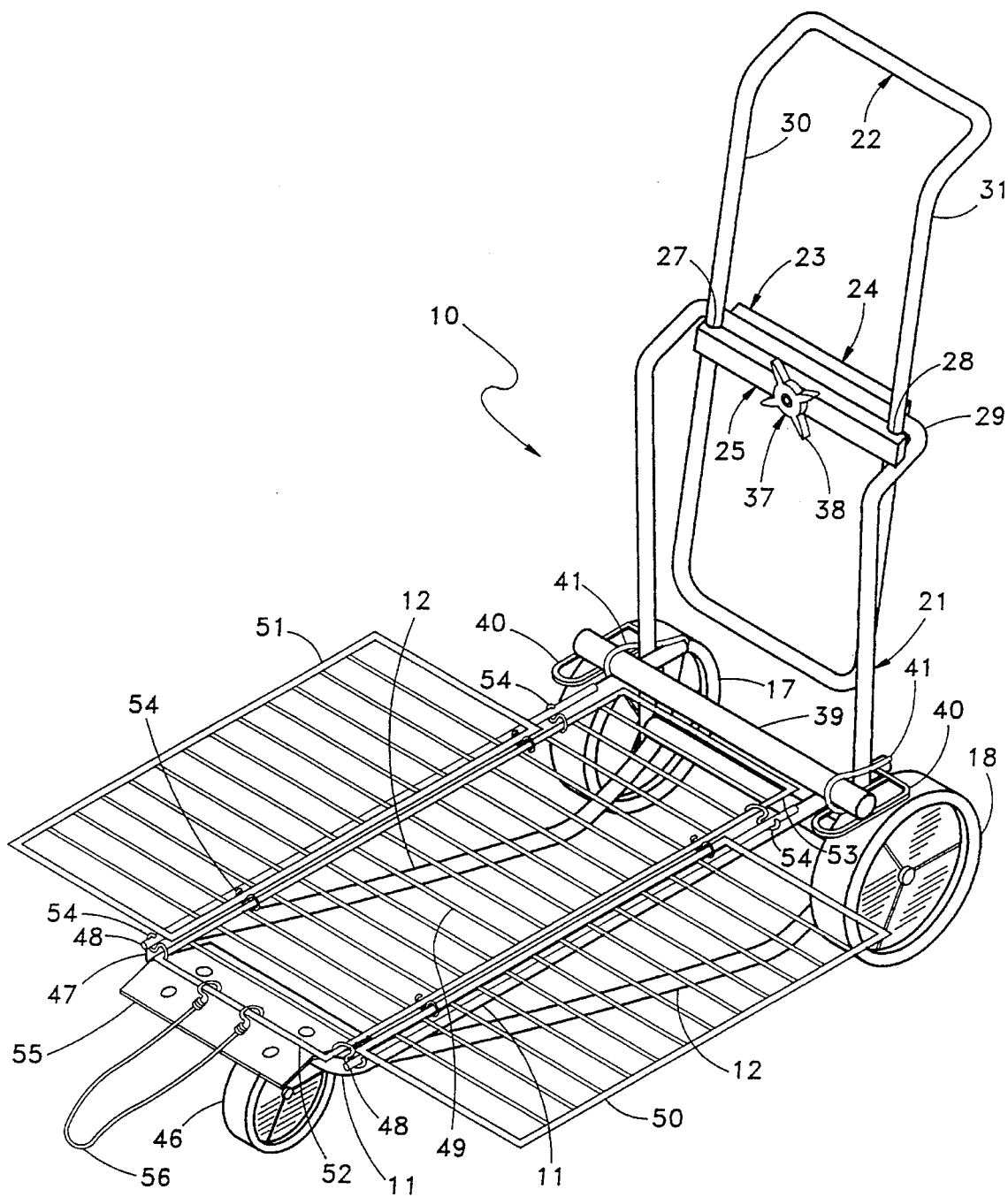
FIG. 1 is a perspective view of the Collapsible Luggage Carrier in the extended in-use configuration and showing the luggage support wings open.
Figure 2:
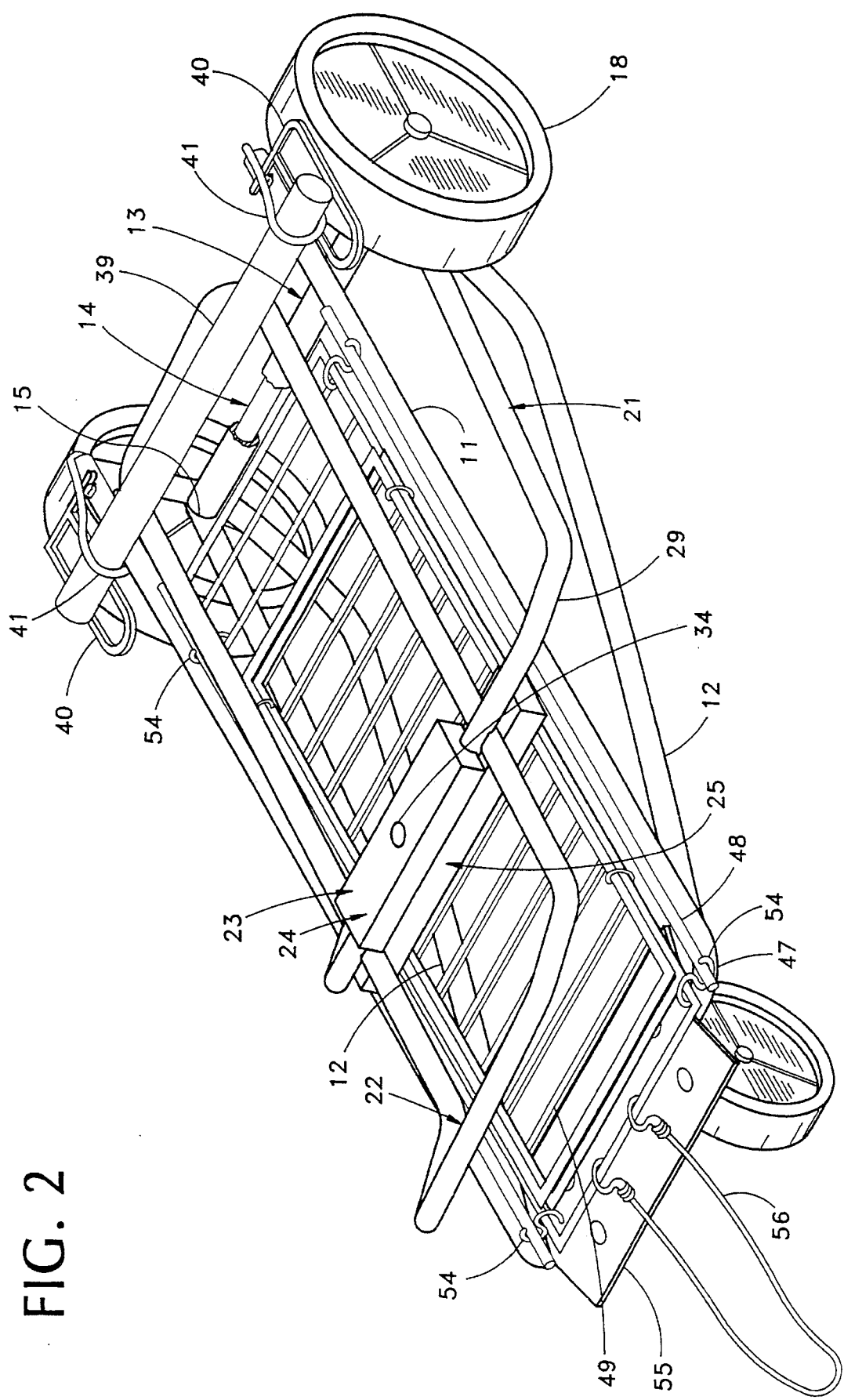
FIG. 2 is a perspective view of the Collapsible Luggage Carrier in the folded storage configuration.
Figure 3:
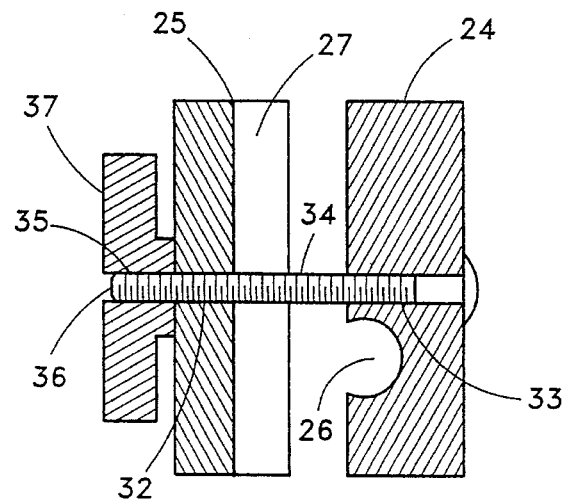
FIG. 3 is an enlarged partial cross-sectional view of the handle locking member.
Figure 4:
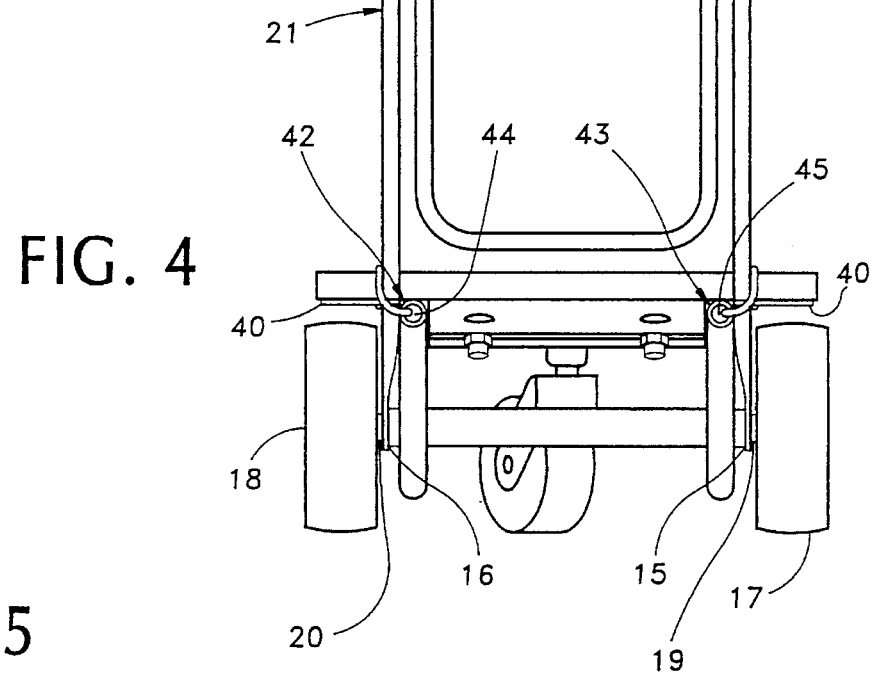
FIG. 4 is a rear view of the Collapsible Luggage Carrier in the extended in-use configuration.
Figure 5:
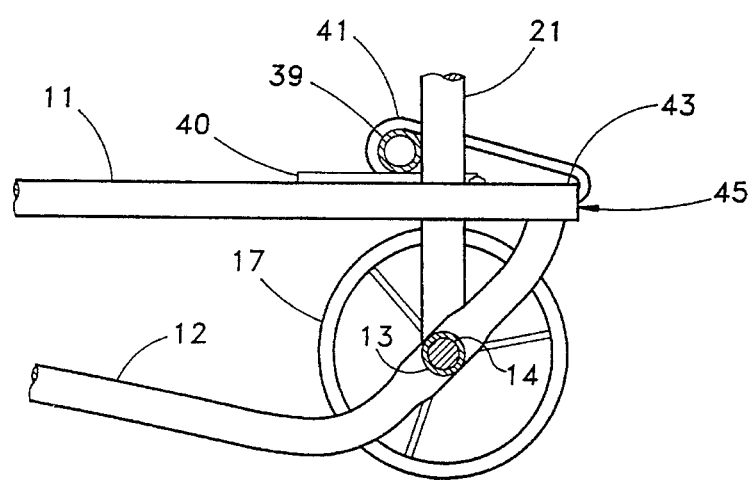
FIG. 5 is an enlarged partial cross-sectional view of the rear wheel axle area.

Referring to FIGS. 1 through 5, a collapsible luggage carrier 10 is shown and described that has a support frame 11 and at least one support arm 12 (preferably two) attached to the support frame 11. There is a tubular axle sleeve member 13 attached to the support arms 12 and a rear axle 14 in and extending beyond opposing ends 15 and 16 of the axle sleeve member 13. There are two rear wheels 17 and 18. A rear wheel is rotatively attached to each end 19 and 20 of the rear axle 14.

A lower handle member 21 is rotatively connected to the rear axle 14 or attached to the axle, sleeve 13 and is adjacent the opposing ends 15 and 16 of the axle sleeve member 13. There is an upper handle member 22 slidingly and lockingly connected to the lower handle 21. A handle locking member 23 is releasably secured to the lower handle member 21 and to the upper handle member 22. The handle locking member 23 has a first bar 24 and a second bar 25 opposing the first bar 24. There is a first channel 26 in the first bar 24 releasably grasping the lower handle member 21 and there are two second channels 27 and 28 in the second bar 25, substantially normal to the first channel 26, releasably grasping the upper handle member 22. A cross member 29 of the lower handle member 21 is placed within the first channel 26 to releasably grasp the lower handle member 21 and each of the side bars 30 and 31 of the upper handle member 22 are placed in the second channels 27 and 28 to releasably grasp the upper handle member 22. A first passageway 32 extends through the first bar 24 and a second passageway 33 extends through the second bar 25. The second passageway directly opposes the first passageway. There is a handle locking rod 34 within and extending through the first passageway 32 and within and extending through the second passageway 33. There is a locking thread 35 on one end 36 of the handle locking rod 34 and there is a locking knob 37 threadingly engaged on the thread 35. There are, also, handgrip protrusions 38 on the locking knob 37 to make it easier to turn the locking knob.

There is a releasable lower handle upright locking brace 39 adjacent the support frame 11 and a pair of opposing locking brace supports 40 abutting the locking brace 39. There are a pair of locking brace locking members 41 (preferably a pair of stretch cords or a set of springs) releasably locking the locking brace 39 to the support frame 11. There is a port 44 and 45 in each of the support frame lock ends 42 and 43 to secure the brace locking members 41. A front wheel 46 is rotatingly connected (Preferably by a castor swivel member) to the support frame 11 at an end 47 of the support frame 11 distal the rear axle 14. A support grill adjustment bar 48 is attached to an upper side of the support frame 11 and a support grille 49 is slidingly connected to the support grill adjustment bar 48 (preferably by S-hooks). There is a pair of support grille wings 50 and 51 hingedly attached to opposing ends 52 and 53 of the support grille (preferably by S-hooks 54). A loading and unloading inclined ramp 55 is on the end 47 of the support frame 11 distal the rear axle 14. There is a stretch cord (Bungee Cord) 56 to help retain the luggage on the carrier.

All parts of the carrier could be made of metal or plastic. The wheels should be banded with a resilient material such as rubber or the like (as are most wheels) to enhance travel and friction on various surfaces. The parts of handle locking member could be made of wood or plastic. The support frame and upper and lower handle members are preferably tubular and the support grille and grille wings are made of a wire rod either metal or plastic. The locking knob may be coated with a nonslip material to aid in its intended use in case a user's hand is wet and slips on the knob.

Starting from the folded position, the locking brace locking members 41 are disconnected and the locking brace 39 removed from its stored position on top of the lower handle member. The lower handle member 21 is unfolded into the upright position and the locking brace 39 is placed in the lock position against the top of the support frame and abuts the locking brace supports 40. The locking brace locking members 41 are secured around the locking brace and secured to the ports 44 and 45 in the support frame thus locking the lower handle member 21 in place. The grille wings 50 and 51 may then be unfolded if desired. With the lower handle member 21 in place, the handle locking member 23 may be loosened by a counter-clockwise turn on the lock knob 37. The upper handle member 22 is pulled up to a selected height and the lock knob 37 is then retightened and the carrier is ready to use. Pieces of luggage may be placed on the support grille 49 and grille wings 50 and 51 and secured onto the carrier 10 with the stretch cord 56. Returning the carrier to the stored configuration is substantially the reverse of the above operation.

The foregoing descriptions and drawings of the invention are explanatory and illustrative only, and various changes in shape, sizes and arrangements of parts as well certain details of the illustrated construction may be made within the scope of the appended claims without departing from the true spirit of the invention

I claim:

1. A collapsible luggage carrier comprising:

(a) a support frame;

(b) at least one support arm attached to the support frame;

(c) a tubular axle sleeve member attached to the support arm;

(d) a rear axle in and extending beyond opposing ends of the axle sleeve member;

(e) a rear wheel rotatively attached to each end of the rear axle;

(f) a lower handle member pivotally connected to the rear axle and adjacent the opposing ends of the axle sleeve member;

(g) an upper handle member slidingly and lockingly connected to the lower handle member;

(h) a releasable lower handle member upright locking brace adjacent the support frame;

(i) a pair of opposing locking brace supports abutting the locking brace;

(j) a front wheel rotatingly connected to the support frame at an end of the support frame distal the rear axle;

(k) a support grille adjustment bar attached to an upper side of the support frame;

(l) a support grille slidingly connected to the support grille adjustment bar; and (m) a support grille wing hingedly attached to opposing ends of the support grille.

2. A collapsible luggage carrier comprising:

(a) a support frame;
(b) at least one support arm attached to the support frame;
(c) a tubular axle sleeve, member attached to the support arm;
(d) a rear axle in and extending beyond opposing ends of the axle sleeve member;
(e) a rear wheel rotatively attached to each end of the rear axle;
(f) a lower handle member pivotally connected to the rear axle and adjacent the opposing ends of the axle sleeve member;
(g) an upper handle member slidingly and lockingly connected to the lower handle member;
(h) a handle locking member, releasably secured to the lower handle member and to the upper handle member, comprising:
  a first bar;
  a second bar opposing the first bar;
  a first channel in the first bar releasably grasping the lower member;
  a pair of second channels in the second bar releasably grasping the upper handle member;
  a first passageway extending through the first bar;
  a second passageway extending through the second bar and directly opposing the first passageway;
  a handle locking rod within and extending through the first passageway and within and extending through the second passageway;
  a locking thread on one end of the handle locking rod;
  a locking knob threadingly engaged on the thread; and
  handgrip protrusions on the locking knob;
(i) a releasable lower handle upright locking brace adjacent the support frame;
(j) a pair of opposing locking brace supports abutting the locking brace;
(k) a front wheel rotatingly connected to the support frame at an end of the support frame distal the rear axle;
(l) a support grille adjustment bar attached to an upper side of the support frame;
(m) a support grille slidingly connected to the support grille adjustment bar; and
(n) a support grille wing hingedly attached to opposing ends of the support grille.

3. A collapsible luggage carrier comprising:
(a) a support frame;
(b) at least one support arm attached to the support frame;
(c) a tubular axle sleeve member attached to the support arm;
(d) a rear axle in and extending beyond opposing ends of the axle sleeve member;
(e) a rear wheel rotatively attached to each end of the rear axle;
(f) a lower handle member pivotally connected to the rear axle and adjacent the opposing ends of the axle sleeve member;
(g) an upper handle member slidingly and lockingly connected to the lower handle member;
(h) a handle locking member, releasably secured to the lower handle member and to the upper handle member, comprising:
  a first bar;
  a second bar opposing the first bar;
  a first channel in the first bar releasably grasping the lower handle member;
  a pair of second channels in the second bar, substantially normal to the first channel, releasably grasping the upper handle member;
  a first passageway extending through the first bar;
  a second passageway extending through the second bar normal and directly opposing the first passageway;
  a handle locking rod within and extending through the first passageway and within and extending through the second passageway;
  a locking thread on one end of the handle locking rod;
  a locking knob threadingly engaged on the thread; and
  handgrip protrusions on the locking knob;
(i) a releasable lower handle upright locking brace adjacent the support frame;
(j) a pair of opposing locking brace supports attached to the support frame and abutting the locking brace;
(k) a pair of locking brace locking members releasably locking the locking brace to the support frame;
(l) a front wheel rotatingly connected to the support frame at an end of the support frame distal the rear axle;
(m) a support grille adjustment bar attached to an upper side of the support frame;
(n) a support grille slidingly connected to the support grille adjustment bar;
(o) a support grille wing hingedly attached to opposing ends of the support grille; and
(p) a loading and unloading inclined ramp on the end of the support frame distal the rear axle.

* * * * *